Patented Sept. 1, 1936

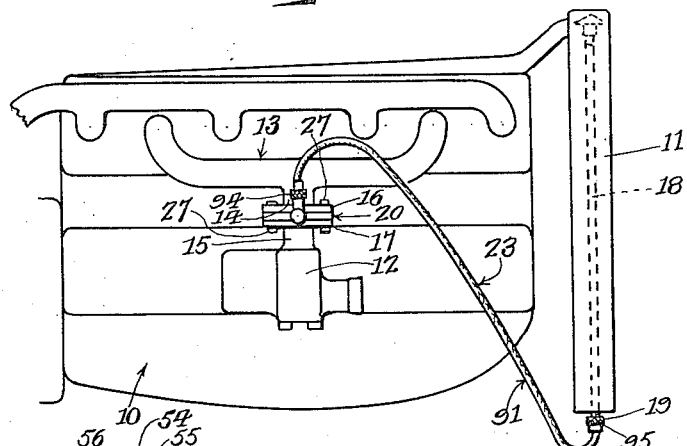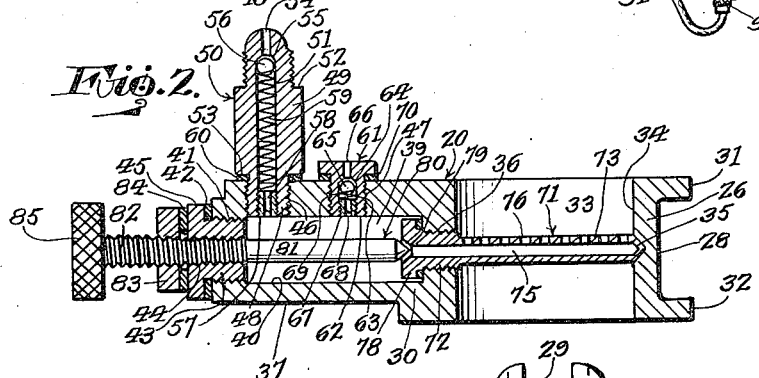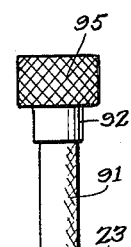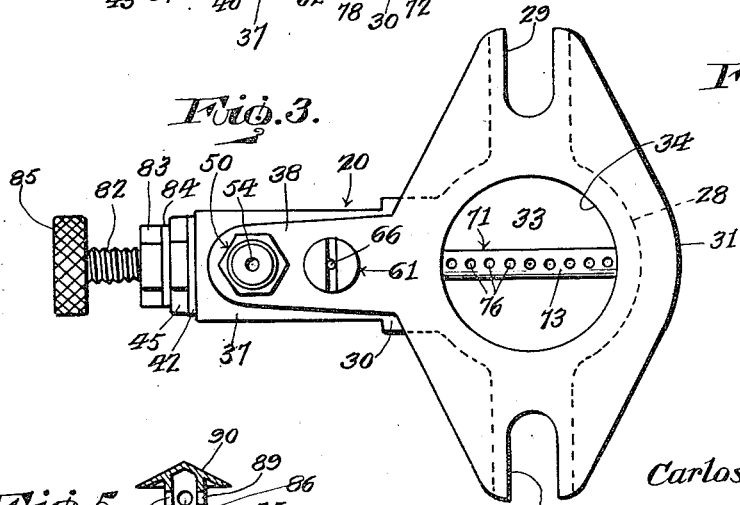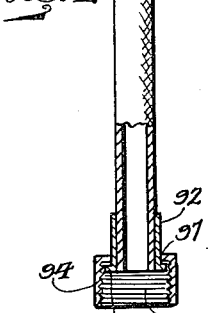

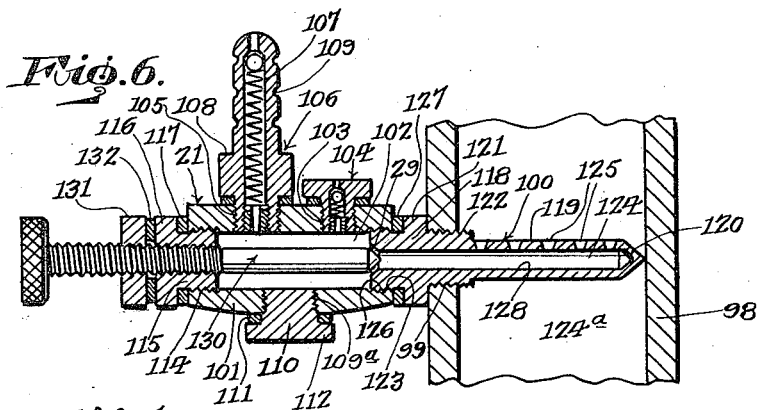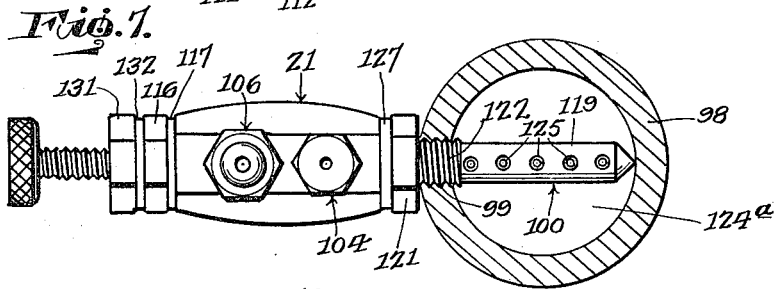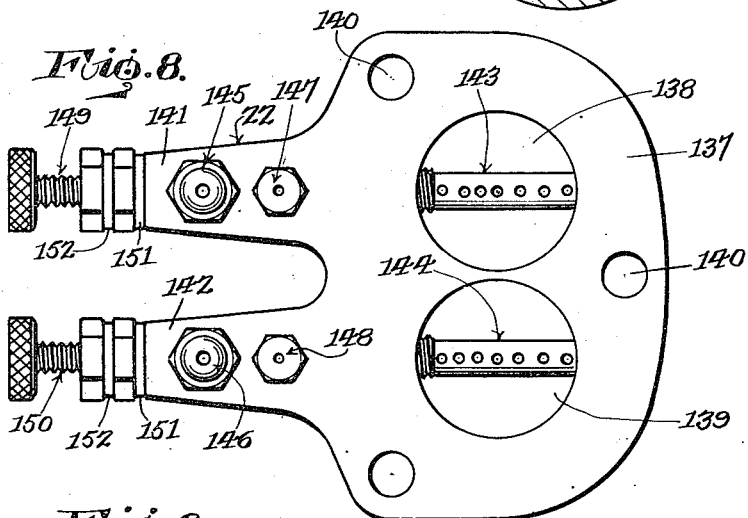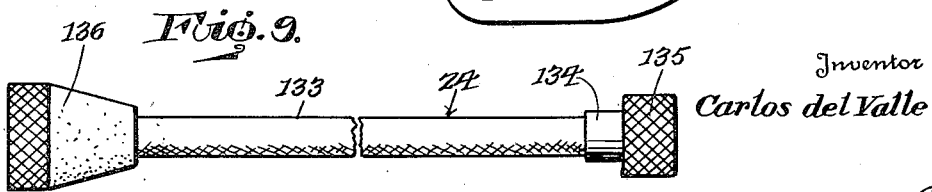

2,052,608

UNITED STATES PATENT OFFICE 2,052,608

COMBUSTIBLE CHARGE FORMING ATTACHMENT FOR INTERNAL COMBUSTION ENGINES

Carlos del Valle, Mexico, D. F., Mexico

Application October 7, 1935, Serial No. 43,980
In Mexico May 8, 1935

2 Claims. (Cl. 123—25)

This invention relates to a combustible charge forming attachment for internal combustion engines, and has for its object to provide, in a manner as hereinafter set forth, an attachment of the class referred to for supplying a mixture of air and water vapor to and for mixing with a combustible charge on the passage of the latter towards the combustion chamber of the engine whereby the efficiency of the operation of the engine materially increased.

The invention further aims to provide, in a manner as hereinafter set forth, an attachment for the purpose referred to, when used reducing the formation of carbon deposits to a minimum, as well as reducing the costs of engine operation.

Further objects of the invention are to provide, in a manner as hereinafter set forth, an attachment for the purpose referred to which is simple in its construction, strong, durable, for installation with respect to the radiator overflow pipe and the intake manifold of the engine, readily installed, thoroughly efficient in its use, conveniently repaired when occasion requires, and comparatively inexpensive.

With the foregoing and other objects in view, the invention consists of the novel construction, combination and arrangement of parts as will be hereinafter more specifically described and as are illustrated in the accompanying drawings wherein are shown embodiments of the invention, but it is to be understood that changes, variations and modifications may be resorted to which fall within the scope of the invention as claimed.

In the drawings:

Figure 1 is a side elevation of an internal combustion engine showing the adaptation therewith of a combustible charge forming attachment in accordance with this invention, Figure 2 is a vertical sectional view of the combined air intake, water vapor receiving, air and water vapor mixing and mixture supply device of the attachment, Figure 3 is a top plan view of the device shown in Figure 2, Figure 4 is a side elevation, broken away of the water vapor conduit, Figure 5 is a vertical sectional view of the element of the attachment to prevent the surging of water relative to the radiator overflow pipe.

Figure 6 is a vertical sectional view of a modified form of combined air intake, water vapor receiving, air and water vapor mixing and mixture supply device, Figure 7 is a top plan view of the device shown in Figure 6, Figure 8 is a top plan view of still another modified form of combined air intake, water vapor receiving, air and water vapor mixing and mixture supply device for use in connection with V-motors, and Figure 9 is a side elevation, broken away of a modified form of water vapor conduit.

With reference to Figure 1 of the drawings an internal combustion engine is indicated at 10, its radiator at 11, its carburetor at 12, and its intake manifold at 13. The manifold 13 is formed of an upper section 14 and a lower section 15 endwise aligning with section 14. The opposed ends of the sections 14, 15 are formed with laterally extending apertured flanges 16, 17 respectively. The section 15 opens into the carburetor 12. The overflow pipe of the radiator 11 is indicated at 18. The pipe 18 has its upper end spaced from the top of the radiator 11. The lower end of pipe 18 depends below the bottom of the radiator. The extended lower end portion 19 of pipe 18 is peripherally threaded.

The attachment includes a combined air intake, water vapor receiving, air and water vapor mixing and mixture supply device. Three forms of these devices are shown, one by Figures 1, 2 and 3, generally indicated at 20, another by Figures 6 and 7 generally indicated at 21, and the other by Figure 8 generally indicated at 22. The attachment also includes a water vapor conduit. Two forms of conduits are shown, one by Figure 4 generally indicated at 23 and the other by Figure 9 generally indicated at 24. The attachment further includes a water surging preventing element shown by Figures 1 and 5 and generally indicated at 25.

The device 20 includes a body part 26 which is interposed between the intake manifold sections 14, 15 and clamped to the flanges 16, 17 by the holdfast devices 27. The body part 26 is formed of circular tubular portion 28 having a pair of oppositely extending radially disposed slotted arms 29 at its sides through which the holdfast devices 27 pass. Integral with the front of portion 28 and spaced from the arms 29 is a squared extension 30. The ends of the body part 26 are oppositely flanged, as at 31, 32 having their edges flush with the edges of the flanges 16, 17 when the device 20 is secured to the manifold 13 between the sections of the latter. The extension 30 is arranged between and projects outwardly from the front sides of the flanges 31, 32. The portion 29 forms a passage 33 having its wall 34 registering with the inner faces of the sections of the manifold 13. The inner side of the wall 34, in alignment with the transverse center of passage 35, is provided with a conoidal shaped cavity 35. The body part 26 diametrically opposite the recess 35 is formed with a horizontally disposed opening 36 communicating at its inner end with passage 33 and having a threaded wall.

Formed integral with the outer end of extension 30 is an outwardly directed shank 37 arranged above the flange 32. A portion of the upper face of shank 37 is flush with the upper face of extension 30. The shank 37 is of less width than the width of extension 30 and has its upper face provided with a tapered enlargement 38 which merges into the outer side of body part 26 above the extension 30. The outer end of enlargement 38 is spaced inwardly of the outer end of the shank.

The device 20 is formed with a mixing chamber 39 for air and water vapor. The chamber is open at its outer end and extends from the outer end edge of the shank to within the extension 30. The outer end of opening 36, in body part 26 communicates with the inner end of the chamber 39. The wall 40 of the latter at its outer end portion is threaded as at 41. Positioned against the outer end edge of the shank is an annular sealing gasket 42. Threadedly engaging with the threads 41 is a peripherally threaded sleeve 43 which is formed with internal threads 44 and at its outer end with a laterally extending annular flange 45 abutting the gasket 42. The latter encompasses the sleeve 43 and is clamped against the shank by flange 45. The shank in proximity to its outer end and in its top is formed with a vertically disposed threaded opening 46 which communicates with the chamber 39 adjacent the inner end of sleeve 43. The top of the shank between opening 46 and its inner end is provided with a vertically disposed threaded opening 47 which communicates with the chamber 39. Threadedly engaging with the wall of opening 46 is the reduced peripherally threaded lower end 48 of the vertically disposed body part 49 of a water vapor controlling inlet valve mechanism 50 for the chamber 39. The said body part 49 is formed with a valve chamber 51 lengthwise thereof, an upper and a lower peripheral shoulder 52, 53 respectively and an intake 54 opening into the upper end of chamber 51. The upper wall of chamber 51 is indicated at 55, is rounded and constitutes a seat for a globular spring controlled valve 56. The lower wall of chamber 51 is provided by the upper end of a tubular member 57 which is threadedly secured in the said reduced lower end 48. The member 57 provides an outlet 58 for the valve chamber 51 which opens into the mixing chamber 39. The member 57 also provides an abutment for the controlling spring 59 for the valve 56. The spring 59 is of the coiled type and is interposed between the upper end of member 57 and valve 56. The upper end 59a of body part 49 is reduced and peripherally threaded. The intake 54 is disposed lengthwise of body part 49, opens at the upper end of the latter and also opens into the upper end of the chamber 51. Surrounding the said reduced lower end 48 and clamped against shank 37 by shoulder 53 is a sealing gasket 60.

Threadedly engaging with the wall of opening 47 and extending above shank 37 is an air intake controlling valve structure 61 for chamber 39. The structure 61 includes a peripherally threaded body part 62 formed with a valve chamber 63 and an annular flange 64 at its upper end. The upper wall 64 of chamber 63 is rounded and constitutes a valve seat for a spring controlled globular valve 65 arranged in chamber 63. The body part 62 is formed with an intake 66 which opens at its upper end at the top of said body part 62 and at its lower end opens into the upper end of chamber 63 through wall 64. The lower wall of chamber 63 is provided by a tubular member 67 which is threadedly secured within body part 62. The member 67 forms an outlet 68 for chamber 63. The outlet 68 opens into chamber 39. The member 67 also provides an abutment for the coiled controlling spring 69 for valve 65. The spring is interposed between member 67 and valve 65. Positioned on shank 37 and encompassing body part 62 is a sealing gasket 70 which is clamped against the shank by the flange 64.

Carried by the body part 26 and extending diametrically of the passage 33 is a mixture supply element 71 formed of a tubular flanged head 72 and a tubular stem 73 having a conoidal shaped closed free end 74 which seats in the cavity 35. The inner diameter of the head and stem are the same. The element 71 forms a conducting channel 75 for the enriched mixture which is discharged into passage 33 by a set of spaced ports 76 formed in the top of the stem 73. The head 72 is of greater outer diameter and of less length than that of stem 73. The flange on head 72 is at its outer end and is indicated at 78. The flange 78 is arranged within chamber 39. The head 72 is peripherally threaded, mounted in and engages with the threads of the wall opening 36. The channel 74 is open at one end at the flanged end of the head and has its other end closed by the end 75 of the stem 73. The wall of channel 74 at its inlet or open end is beveled to provide a valve seat 79 for coacting with an adjustable needle valve 80 for controlling the intake of the mixture to the channel 74 from the chamber 39. The stem 81 of valve 80 is rotatable and has its outer portion peripherally threaded, as at 82. The stem 81 passes through and has threaded engagement with the internal threads of sleeve 43. The stem 81 projects outwardly from the shank 37 and carries a lock nut 83. Arranged between the outer end of sleeve 43 and the nut 83 is a seating gasket 84. The outer end of stem 81 carries a thumb or finger grip 85 to facilitate the adjustment thereof.

The element 25 is positioned in and extends above the intake end of the radiator overflow pipe 18 and functions to prevent the surge of water into pipe 18, but does not prevent the water vapor from entering the pipe. The element 25 comprises a tubular body part 86 having a reduced resilient bifurcated lower end portion 87, an annular peripheral shoulder 88 and a plurality of intake openings 89. The body part 86 is open at its lower end and closed at its upper end by a conoidal shaped cap 90 of greater diameter than the body part 86. The reduced end portion 87 of body part 86 is extended into and frictionally engages with the inner face of pipe 18. The shoulder 88 seats on the top edge of pipe 18. The water vapor passes through the openings 89 into pipe 18.

The water vapor conduit 23 which associates with the device 20 comprises a flexible hose 91 of the desired length provided thereon and at its ends with oppositely disposed metallic bands 92 formed with laterally directed annular flanges 93 at their outer ends. Encompassing loosely the bands 91 inwardly of the flanges 93 are coupling collars, one indicated at 94 and the other at 95. Each collar has internal threads 96 and an inwardly extending flange 97 at its inner end coacting with a flange 93 for connecting the collar to a band. The collar 94 coacts with the reduced upper end 59a of body part 49 for connecting the hose 91 to the valve mechanism 50. The collar 95 coacts with the threaded lower portion 19 of pipe 18 for connecting the hose 91 to the radiator overflow pipe 18 whereby on the suction stroke of the engine water vapor will be conducted by the conduit 23 and supplied to chamber 39. On the suction stroke of the engine air will be pulled into chamber 39 and mixed with the water vapor to provide the mixture for the combustible charge. On the suction stroke of the engine the enriching mixture will be drawn into passage 33 and mixed with the combustible charge traveling through passage 33 whereby the combustible charge will be enriched, as well as the enriching mixture also acting to break up the globules in the combustible charge. The enriching of the latter materially increases the efficiency of the operation of the engine.

The device 21 is not interposed between the sections of an intake manifold but extends into the latter. With reference to Figure 6 there is shown a non-sectional intake manifold 98 formed in its front side with a threaded opening 99 for the extension therein and diametrically thereof of an enriching mixture supply element 100 forming a part of the device 21 and which will be more fully referred to. The device 21 includes a tubular casting 101 open at each end and which coacts with hereinafter referred to parts of the device 21 to provide a water vapor and air mixing chamber 102. The top of casting 101 is formed with a threaded opening 103 which communicates with chamber 102 and has secured therein an air inlet valve mechanism 104 of the same form and arrangement as that of the valve mechanism 61. The top of casting 101 outwardly adjacent to the opening 103 is provided with a threaded opening 105 which communicates with chamber 102. Secured within opening 105 and extending upwardly from casting 101 is a water vapor inlet valve mechanism 106 of the same form and arrangement as the valve mechanism 50, with this exception that the reduced upper end portion 107 of the body part 108 of mechanism 106 is formed with superposed annular peripheral grooves 109 instead of it being peripherally threaded as is the reduced upper portion of the body part 49 of mechanism 50. The bottom of casting 101 is formed with a threaded opening 109a normally closed by a flanged plug 110. The opening 109 constitutes a drain for chamber 102. A sealing gasket 111 is interposed between the flange 112 of plug 110 and casting 101.

The outer end portion of the wall 113 of the chamber 102 is formed with threads 114. The outer end wall of chamber 102 is provided by a sleeve 115 formed with external and internal threads throughout. The sleeve 115 has threaded engagement with the threads 114. The outer end of sleeve 115 is formed with a laterally extending annular flange 116. Positioned between the outer end of casting 101 and the flange 116, as well as encompassing sleeve 115 is a sealing gasket 117 which is clamped in position by the flange 116 when sleeve 115 is secured within the casting 101.

The element 100 is an integral structure and includes a tubular head 118 and a tubular stem 119 which is integral at the outer end with the inner end of the head 118. The inner end 120 of stem 119 is closed and is of conoidal contour. The head 118 intermediate its ends is formed with a laterally extending annular peripheral flange 121. The periphery of the head adjacent each side of the flange 121 is threaded throughout as at 122, 123. The inner diameter of the head and stem are the same. The element 101 provides a channel 124 for conducting mixture into the manifold 98 for the purpose of mixing with and enriching the combustible charge as it travels through the passage 124a provided by the manifold 98 in a direction towards the combustion chamber of the engine. The enriching mixture is discharged into the passage 124a through a series of spaced ports 125 formed in the top of the stem 119. The head 118 at its inner end extends through the opening 99 into passage 124a. The stem 119 is disposed diametrically of passage 124a. The head 118 is anchored to the manifold 98 by the engagement of the threads 123 with the threads on the wall of opening 99. The flange 121 abuts the outer periphery of manifold 98. The outer end of head 118 extends into the inner end 20 of casting 101 and provides the inner end wall of chamber 102. The wall 113 of the chamber 102 is formed with threads 126 which coact with the threads 122 for anchoring element 100 to casting 101. Surrounding the head 118 and interposed between the inner end of casting 101 and flange 121 is a sealing gasket 127. The wall 128 of the channel 124 at the outer or intake end of the latter is beveled to form a valve seat 129 which coacts with an adjustable needle valve 130 of the same form and arrangement and for the same purpose as the needle valve 80. A lock nut 131 and sealing gasket 132 is associated with needle valve 130.

The water vapor conduit 24 is of the same construction as the conduit 23 with this exception that the hose 133 of conduit 24 is not provided with a coupling collar at each end. The hose 133 has a flanged band 134 at one end carrying a coupling collar 135. The other end of hose 133 has an enlarged tubular resilient head 136 for receiving and engaging in the grooves of the reduced upper portion 107 of the body part 108 of the valve mechanism 106 whereby the latter will be frictionally coupled to the hose 133. The collar 135 is connected to the lower depending portion 19 of the radiator overflow pipe 18.

The device 22 is of the duplex type for use in connection with a twin passage manifold employed for a V-motor. With reference to Figure 8 the device 22 includes a body part 137 formed with a pair of spaced passages 138, 139. The body part 137 is adapted to be interposed in a manifold, not shown of the twin passage type and the passages 138, 139 of body part 137 are adapted to register with the passages of the manifold. The body part 137 has openings 140 for the passage of holdfast means, not shown to anchor it to the manifold. Extending outwardly from the front side of body part 137 is a pair of spaced shanks 141, 142 and each of which is constructed substantially in the same manner as shank 37. A pair of mixture supply elements 143, 144 are employed and each of which is similar in construction, for the same purpose, and arranged in a similar manner as the mixture supply means as set forth by Figures 2 and 3. A pair of water vapor inlet valve mechanisms 145, 146 form parts of the device 22 and each of which is similar in construction, for the same purpose and arranged in the same manner as mechanism 50. A pair of air inlet valves 147, 148 also form parts of the device 22 and each of which is similar in construction, for the same purpose and arranged in a similar manner as mechanism 61, and a pair of needle valves 149, 150 form parts of the device 22 and each of which corresponds in structure to, for the same purpose and arranged in a similar manner as needle valve 80. Sealing gasket 151, 152 corresponding to and arranged in the same manner as gasket 42, 84 respectively also form parts of device 22.

The water vapor conduit which will be used in connection with device 22 will correspond to conduit 23, with this exception that it will be branched for the purpose of coupling it to the valve mechanisms 145, 146.

The devices 21, 22 will function for the same purpose as the device 20.

What I claim is:

1. In a combustible charge forming attachment for internal combustion engines, a horizontally disposed internally threaded hollow part, an internally and externally threaded hollow structure extending into and threadedly engaging with said part closing one end of the latter, a stationary tubular element closed at its outer end and having its inner face at its inner end formed with a valve seat positioned within said part, said element extended laterally from said part and being formed in its top, intermediate its ends, with mixture discharge openings, said structure, said valve seat forming end of said element and said part coacting to provide a water vapor and air mixing chamber opening into the inner end of said element, a water vapor intake element anchored to said part, opening into said chamber and including a resiliently supported controlling valve, an air intake element anchored to said part, opening into said chamber and including a resiliently supported controlling valve, and a mixture discharge controlling element extending through and threadedly engaging with said structure and coacting with said seat.

2. In a combustible charge forming attachment for internal combustion engines, a horizontally disposed internally threaded hollow part, a vertically disposed hollow part integral with one end of said horizontal part, said vertical part being formed with a threaded opening leading from one of said parts to the other, an internally and externally threaded hollow structure extending into and threadedly engaging with said horizontal part for closing one end of the latter, a stationary tubular element closed at one end and having its inner face at its other end formed with a valve seat positioned at the other end of said horizontal part, said element extended laterally from said horizontal part, threadedly engaging with the wall of said opening, extending across said vertical part and being formed in its top intermediate its ends with mixture discharge openings, said structure, the said valve seat forming end of said element and the said horizontal part coacting to provide a water vapor and air mixing chamber opening into said element, a water vapor intake element anchored to said horizontal part, opening into said chamber and including a resiliently supported controlling valve, an air intake element anchored to said horizontal part, opening into said chamber and including a resiliently supported controlling valve, and a mixture discharge controlling element extending through and threadedly engaging with said structure and coacting with said seat.

CARLOS DEL VALLE.